United States Patent [19]
Yamauchi et al.

[11] Patent Number: 5,292,595
[45] Date of Patent: Mar. 8, 1994

[54] CLAD ALUMINUM ALLOY MATERIAL HAVING HIGH STRENGTH AND HIGH CORROSION RESISTANCE FOR HEAT EXCHANGER

[75] Inventors: Shigenori Yamauchi, Aichi; Yoshifusa Shoji, Nagoya; Kenji Kato; Yuji Suzuki, both of Tokyo; Chian T. Su, Naogya; Mituo Hashiura, Kariya; Sunao Fukuda, Handa, all of Japan

[73] Assignee: Sumitomo Light Metal Industries, Ltd., Tokyo, Japan

[21] Appl. No.: 19,127

[22] Filed: Feb. 17, 1993

[30] Foreign Application Priority Data

Feb. 18, 1992 [JP] Japan .................................. 4-030644
Feb. 18, 1992 [JP] Japan .................................. 4-030646
Feb. 18, 1992 [JP] Japan .................................. 4-030648

[51] Int. Cl.5 .................... B32B 15/20; F28F 19/06; F28F 21/08
[52] U.S. Cl. .................................. 428/654; 428/933; 165/134.1; 165/180; 165/905
[58] Field of Search ................. 428/654, 933; 165/180, 165/134.1, 905

[56] References Cited

U.S. PATENT DOCUMENTS

| | | | |
|---|---|---|---|
| 4,098,957 | 7/1978 | Vernam et al. ................... | 428/654 |
| 4,146,164 | 3/1979 | Anderson et al. ................ | 428/654 |
| 4,511,632 | 4/1985 | Toma et al. ...................... | 428/654 |
| 4,560,625 | 12/1985 | Kaifu et al. ...................... | 428/654 |
| 4,727,001 | 2/1988 | Takemoto et al. ............... | 428/654 |
| 4,761,267 | 8/1988 | Takeno et al. ................... | 428/654 |
| 5,011,547 | 4/1991 | Fujimoto et al. ................. | 148/24 |
| 5,099,912 | 3/1992 | Tajima et al. .................... | 165/134.1 |

FOREIGN PATENT DOCUMENTS

| | | | |
|---|---|---|---|
| 2461916 | 2/1981 | France . | |
| 56-127194 | 10/1981 | Japan ............................. | 165/134.1 |
| 56-127195 | 10/1981 | Japan ............................. | 165/134.1 |
| 59-100250 | 6/1984 | Japan ............................. | 428/654 |
| 59-116353 | 7/1984 | Japan ............................. | 428/654 |
| 61-89498 | 5/1986 | Japan ............................. | 165/134.1 |
| 62-207642 | 9/1987 | Japan ............................. | 428/654 |
| 63-89641 | 4/1988 | Japan . | |
| 63-28704 | 6/1988 | Japan . | |

OTHER PUBLICATIONS

Patent Abstracts of Japan, vol. 12, No. 326 (C-525)5 Sep. 5, 1988 and JP-A-63 089 641 (Sumitomo Light Metal Ind. Ltd.), Published Apr. 20, 1988.

*Primary Examiner*—John Zimmerman
*Attorney, Agent, or Firm*—Flynn, Thiel, Boutell & Tanis

[57] ABSTRACT

A clad aluminum alloy material having high strength and high corrosion resistance for a heat exchanger, which is composed of a core material made of an aluminum alloy consisting of 0.3 to 2.0% of Mn, 0.25 to 0.8% of Cu, 0.05 to 1.0% of Si and 0.5% or less of Mg with the balance consisting of Al and unavoidable impurities; a sacrificial anode material bonded to one surface of the core material, the sacrificial anode material being made of an aluminum alloy consisting of 1.0 to 2.5% of Mg and 0.05 to less than 0.20% of Si with the balance consisting of Al and unavoidable impurities; and a cladding bonded to the other surface of the core material, the cladding being made of a brazing filler metal consisting of an Al-Si-base aluminum alloy. In the clad aluminum alloy materials, the core material may further include 0.35% or less of Ti and the sacrificial anode material may further include 3.0% or less of Zn or at least one member selected from the group consisting of 0.2% or less of In, 0.2% or less of Sn and 0.2% or less of Ga.

6 Claims, 1 Drawing Sheet

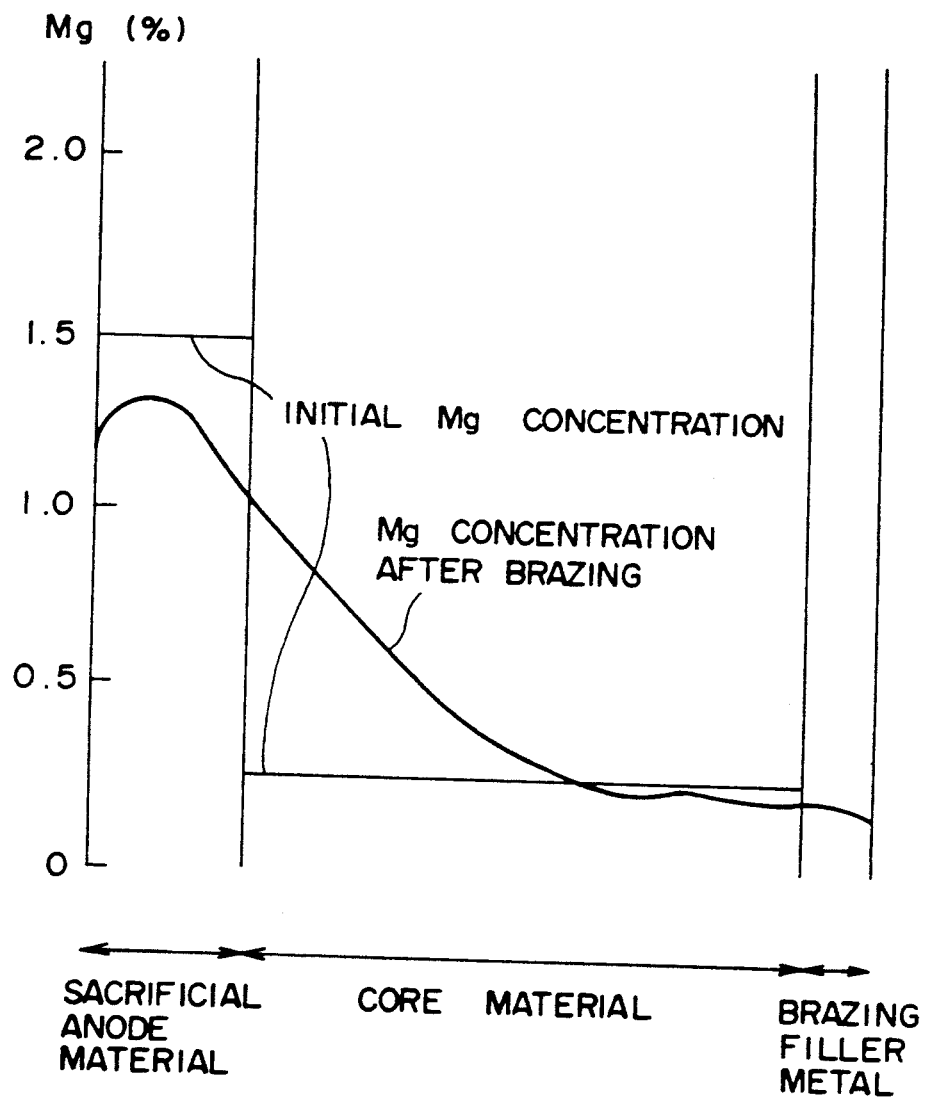

CLAD ALUMINUM ALLOY MATERIAL HAVING HIGH STRENGTH AND HIGH CORROSION RESISTANCE FOR HEAT EXCHANGER

BACKGROUND OF THE INVENTION

1. Field of the Invention

The present invention relates to a clad aluminum alloy material having a good brazability and high strength and corrosion resistance after brazing and suitable for use as a tube material, a header plate material, etc., which are structural members used in the production of an Al heat exchanger, such as a radiator or a heater core, by brazing in an inert gas atmosphere by using of a fluoride flux or brazing in vacuum, particularly suitable for the fabrication of tubes having a small wall thickness.

2. Description of the Prior Art

A clad material having a three-layer structure, comprising a core material consisting of an Al-Mn-base alloy, such as 3003, clad on one surface with an Al-Si-base brazing filler metal and on the other surface with a sacrificial anode material of an Al-Zn-base alloy or Al-Zn-Mg-base alloy, has been used as tube materials or header plate materials for automobile radiators, heater cores, etc. Throughout the specification, aluminum alloy numbers represent the designations by JIS (Japanese Industrial Standards). The Al-Si-base brazing filler metal is used for joining a tube to a fin and joining a tube to a header plate. In many cases, the brazing is conducted in an inert gas atmosphere by using of a fluoride flux or vacuum brazing. The other surface of the core material clad with the sacrificial anode material is located inside (on the side of water) during use to exhibit a sacrificial anode action which prevents the occurrence of pitting corrosion of the core material or crevice corrosion.

In recent years, there is an ever-increasing demand for a reduction in the weight of radiators, heater cores, etc., which requires a reduction in the wall thickness of the tube materials or header plate materials. An increase in the strength, particularly an improvement in the strength after brazing, is necessary for this purpose. This has led to a tendency that Mg is added to the core material for the purpose of increasing the strength. However, Mg lowers the corrosion resistance and, at the same time, is detrimental to the brazability. Specifically, in the case of brazing using a fluoride flux, Mg diffuses into the surface during brazing and reacts with the fluoride flux, so that a flocculent product (a fluoride of Mg) is formed, which brings about deposition or joining failure. In the vacuum brazing as well, Mg is detrimental to brazing. For this reason, the amount of addition of Mg to the core material is limited to 0.5% at the maximum, practically 0.2 to 0.3%, which is obstacle to an increase in the strength.

There is a possibility that the strength of the tube material or header plate material can be increased also by adding Mg to the sacrificial anode material. Several proposals have hitherto been made on clad materials wherein Mg was added to the sacrificial anode material.

Specifically, the following proposals have been made on the addition of Mg to the sacrificial anode material of header materials or tube materials for radiators:

(1) a method wherein Mg and Zn or the like are incorporated (see Japanese Patent Publication No. 28704/1988);

(2) Zn and Mg are added (see Japanese Patent Laid-Open No. 89498/1986);

(3) Sn and Mg are simultaneously added (see Japanese Patent Laid-Open Nos. 16646/1981 and 89641/1988);

(4) Mg and Zn are added in relatively large amounts (see Japanese Patent Publication No. 45301/1987); and (5) Mg or a combination of Mg with Zn or the like is added (see Japanese Patent Laid-Open No. 175093/1990).

In the methods (1) and (2), Mg is added in an amount as small as 1.1% or 1.5% or less for the purpose of preventing pitting corrosion or crevice corrosion. In these methods, no improvement in the strength is attained.

In the method (3), Mg is added for the purpose of inhibiting the intergrannular diffusion of Sn to prevent the occurrence of cracking during hot rolling. In the method (4), Mg is added for the purpose of improving the pitting corrosion resistance. In all the methods, there is a possibility that, when the Mg content is high, Mg diffuses to attain the effect of improving the strength to some extent. In the method (5), the strength is improved through the diffusion of Mg into the core material. When a thin-walled tube material (a clad material) is prepared, although the strength of the core material can be increased by virtue of Mg diffusion from the sacrificial anode material, mere addition of Mg alone causes the strength of the sacrificial anode material to be unsatisfactory, so that the strength of the clad material as a whole cannot be increased. That is, in a reduction in the wall thickness, the contribution of not only the core material but also the sacrificial anode material to the strength becomes large, which makes it necessary to increase the strength of the sacrificial anode material as well.

Accordingly, an object of the present invention is to provide a clad material which can attain a high strength after brazing with the amount of addition of Mg to the core material being limited to 0.5% at the maximum and prevents the thickness of the sacrificial anode layer from becoming excessively large.

The present inventors have made studies on a method to ensure a high strength even after brazing while limiting the amount of addition of Mg to the core material to 0.5% at the maximum and, as a result, have found that an addition of large amounts of Mg and Si to a sacrificial anode material causes a part of the Mg in the sacrificial anode material to diffuse into the core material during brazing and, thereby, to strengthen the core material, that the sacrificial anode material per se is strengthened by Mg and Si, and that although an increase in the Si content of the sacrificial anode material brings about intergranular corrosion when the cooling rate after brazing is small, the intergranular corrosion can be prevented by appropriately regulating the Si content to a suitable value, which has led to the completion of the present invention.

Specifically, Mg is allowed to exist in the sacrificial anode material together with Si in such an amount as will not be detrimental to the corrosion resistance in order for the Mg to contribute to the strengthening of the core material and, at the same time, for the purpose of strengthening the sacrificial anode material through solid solution strengthening by Mg and Si and age hardening strengthening by the precipitation of $Mg_2Si$.

SUMMARY OF THE INVENTION

Accordingly, the first feature of the present invention provides a clad aluminum alloy material having high strength and high corrosion resistance for a heat exchanger, which is composed of:

a core material made of an aluminum alloy consisting of 0.3 to 2.0% of Mn, 0.25 to 0.8% of Cu, 0.05 to 1.0% of Si and 0.5% or less of Mg with the balance consisting of Al and unavoidable impurities;

a sacrificial anode material bonded to one surface of the core material, the sacrificial anode material being made of an aluminum alloy consisting of 1.0 to 2.5% of Mg and 0.05 to less than 0.20% of Si with the balance consisting of Al and unavoidable impurities; and a cladding bonded to the other surface of the core material and made of a brazing filler metal consisting of an Al-Si-base alloy.

According to the second feature of the present invention, there is provided a clad aluminum alloy having high strength and high corrosion resistance for a heat exchanger, which is composed of:

a core material made of an aluminum alloy consisting of 0.3 to 2.0% of Mn, 0.25 to 0.8% of Cu, 0.05 to 1.0% of Si, 0.5% or less of Mg and 0.35% or less of Ti with the balance consisting of Al and unavoidable impurities;

a sacrificial anode material bonded to one surface of the core material, the sacrificial anode material being made of an aluminum alloy consisting of 1.0 to 2.5% of Mg and 0.05 to less than 0.20% of Si with the balance consisting of Al and unavoidable impurities; and a cladding bonded to the other surface of the core material and made of a brazing filler metal consisting of an Al-Si-base aluminum alloy.

In the clad aluminum alloy materials as specified above, the sacrificial anode material may be made of an aluminum alloy consisting of 1.0 to 2.5% of Mg, 0.05 to less than 0.20% of Si and 3.0% or less of Zn with the balance consisting of Al and unavoidable impurities. Further, the sacrificial anode material may also be made of an aluminum alloy consisting of 1.0 to 2.5% of Mg, 0.05 to less than 0.20% of Si and at least one member selected from the group consisting of 0.2% or less of In, 0.2% or less of Sn and 0.2% or less of Ga with the balance consisting of Al and unavoidable impurities.

All composition percentages set forth in the specification and claims are percent by weight unless otherwise indicated.

BRIEF DESCRIPTION OF THE DRAWING

The single FIGURE is a cross-sectional diagram showing the Mg concentration distribution after brazing of the material according to the present invention.

DETAILED DESCRIPTION OF THE PREFERRED EMBODIMENTS

The reason for the limitation of the composition and its range in the present invention will now be described.

(1) CORE MATERIAL

Mn:

Mn serves to improve the strength. Further, it renders the potential of the core material noble to increase the difference in the potential between the core material and the sacrificial anode material, thus improving the corrosion resistance. When the content of Mn is less than 0.3%, the effect is unsatisfactory, while when the content exceeds 2.0%, coarse compounds are formed during casting, so that no sound plate material can be prepared.

Cu:

Cu serves to render the potential of the core material noble, which causes the difference in the potential between the sacrificial anode material and the core material and between the brazing filler metal and the core material to become large, so that the corrosion preventive action derived from the sacrificial anode effect of the sacrificial anode material and brazing filler metal can be enhanced. Further, Cu in the core material diffuses into the sacrificial anode material and brazing filler metal during brazing to form a gentle concentration gradient, so that the potential of the core material side becomes noble while the potential of the surface side of each of the sacrificial anode material and brazing filler metal becomes less noble and, at the same time, a gentle potential distribution is formed between the core material side and each surface side. As a result, the corrosion morphology becomes a general corrosion type.

Cu in the core material contributes also to an improvement in the strength.

The above-described corrosion preventive action and strength improvement effect of Cu cannot be attained when the Cu content of the core material is less than 0.25%. On the other hand, when the content exceeds 0.8%, the corrosion resistance of the core material per se becomes poor and, at the same time, the melting point of the core material becomes so low that there occurs local melting during brazing.

Si:

Si serves to improve the strength of the core material. In particular, when it exists together with Mg diffused from the sacrificial anode material during brazing, the strength becomes higher by virtue of age hardening after brazing. When the content of Si is less than 0.05%, the effect is unsatisfactory, while when the content exceeds 1.0%, not only the corrosion resistance lowers but also the melting point of the core material lowers, which brings about local melting during brazing.

Mg:

Mg deteriorates the brazability although it serves to improve the strength of the core material. For this reason, the Mg content of the core material should be 0.5% or less. Specifically, in the case of brazing using a fluoride flux, when the Mg content exceeds 0.5%, it reacts with the fluoride flux to deteriorate the brazability or to form a fluoride of Mg which deteriorates the appearance of the product. On the other hand, in the case of vacuum brazing, when the Mg content exceeds 0.5%, the filler metal becomes liable to attack the core material.

Ti:

Ti serves to further improve the corrosion resistance of the core material. Specifically, Ti is divided into a high concentration region and a low concentration region which are alternately distributed in a layered form in the direction of the thickness wherein the region having a lower Ti concentration is preferentially corroded over the region having a higher Ti concentration and the corrosion morphology becomes a layered corrosion type. Consequently, the progress of the corrosion towards the direction of the plate thickness is prevented to improve the pitting corrosion resistance of the material. When the Ti content exceeds 0.35%, coarse compounds are formed during casting, so that no sound plate material can be prepared.

Other elements:

Fe, Zn, Cr, Zr, etc., may be contained in such amounts as will not be detrimental to the effect of the present invention. The Fe content is preferably 0.7% or less, because the compound of Fe in a large amount is detrimental to the corrosion resistance. Zn serves to render the potential of the core material less noble to reduce the potential difference between the core material and the sacrificial anode material and between the core material and the brazing filler metal, and, hence, the Zn content is preferably 0.2% or less.

(2) SACRIFICIAL ANODE MATERIAL

Mg:

Part of Mg in the sacrificial anode material diffuses into the core material mainly during brazing to improve the strength of the core material together with Si and Cu in the core material. Further, Mg remaining in the sacrificial anode material together with Si serves to improve the strength of the sacrificial anode material. These actions contribute to an improvement in the strength of the clad material as a whole. When the Mg content is less than 1.0%, the effect is unsatisfactory, while when the Mg content exceeds 2.5%, local melting occurs during brazing unfavorably.

Mg contained in the sacrificial anode material diffuses into the core material during brazing with the concentration distribution as shown in the FIGURE, so that there occurs no detriment to the brazability derived from the diffusion of a large amount of the Mg into the brazing filler metal. Further, the diffusion occurs also during the production of the clad material, and it is needless to say that there is a slight concentration distribution at the boundary between the core material and the sacrificial anode material.

Si:

Si serves to improve the strength of the sacrificial anode material, which contributes to an improvement in the strength of the clad material as a whole. In particular, it brings about age hardening together with Mg remaining in the sacrificial anode material for contribution to the strength. When the Si content is less than 0.05%, the effect is unsatisfactory. The higher the Si content, the higher the strength. However, when the Si content is 0.20% or more, intergranular corrosion occurs in the sacrificial anode material and just beneath the sacrificial anode material if the cooling rate after brazing is low.

Zn:

Zn renders the potential of the sacrificial anode material less noble and ensures the sacrificial anode effect. Specifically, the corrosion morphology becomes a general corrosion type and pitting corrosion and crevice corrosion are prevented. When the content of Zn exceeds 3.0%, the self-corrosion resistance of the sacrificial anode material is detrimentally reduced and corrosion rate becomes excessive.

Sn, In and Ga:

Sn, In and Ga serve to render the potential of the sacrificial anode material less noble when they are added in very small amounts, whereby the sacrificial anode effect can be attained without fail for the core material. Consequently, pitting corrosion and crevice corrosion of the core material are prevented. When their contents exceed their respective upper limits, not only the self-corrosion resistance and rollability are deteriorated but also the diffusion during brazing becomes significant, which increases the thickness of the sacrificial anode layer. When these elements are added in very small amounts, the diffusion rate of these elements are not so high as opposed to the case of Zn that there is no possibility that the thickness of the diffusion layer after brazing will be significantly larger than that of the sacrificial anode material before brazing. Therefore, it is possible to arbitrarily regulate the thickness of the corrosion allowance to a small value.

Other elements such as Fe, Cu, Mn, Ti, Cr, Zr, etc., may be contained each in such an amount as will not be detrimental to the effect of the present invention. Since, however, Cu and Mn render the potential of the sacrificial anode material noble, the contents of Cu and Mn are preferably 0.05% or less and 0.5% or less, respectively.

(3) BRAZING FILLER METAL

The brazing filler metal is an Al-Si alloy commonly employed in the art. In general, an Al-Si alloy having an Si content in the range of from 6 to 13% is used. In the case of vacuum brazing, an Al-Si-Mg-base alloy or an Al-Si-Mg-Bi-base alloy is used.

The present invention will now be described in more detail with reference to the following Examples.

EXAMPLE 1

Ingots of alloys for the core materials specified in Table 1, alloys for the sacrificial anode materials specified in Table 2 and 4045 alloy (Al-10.2% Si) and 4343 alloy (Al-7.5% Si) for the brazing filler metals were prepared, and the alloys for the core materials and alloys for the sacrificial anode materials were subjected to a homogenizing treatment. Then, the alloys for the sacrificial materials and alloys for the brazing filler metals were hot-rolled to a predetermined thickness. These hot-rolled alloys were further hot-rolled in combination with the ingots of the alloys for the core materials to provide clad materials. Thereafter, the clad materials were subjected to cold rolling, intermediate annealing and cold rolling to prepare plates having a thickness of 0.25 mm (H14 materials). In the clad materials, the thicknesses of core material, the sacrificial anode material and the brazing filler were 0.20 mm, 0.025 mm and 0.025 mm, respectively.

The compositions of alloys for the respective materials and combinations of the materials are as listed in Table 3.

A 0.10-mm thick corrugated fin made from an Al-1.2% Mn-1.5% Zn alloy was put on the brazing filler metal side of each of the resultant clad plate materials. Each assembly thus prepared was subjected to brazing in a nitrogen gas by using of a fluoride flux. The brazing temperature (material temperature) was 600°0C. After brazing, the state of joining of the plate material to the fin was examined with the naked eye, while the state of melting of the core material and that of the sacrificial anode material were metallographically examined on the section thereof. The results are summarized in Table 3. In Table 3, the mark "o" indicates a good joining state and the mark "x" indicates an unacceptable joining state due to local melting in the core material or the sacrificial anode material, joining failure, etc.

Then, the plate materials having a thickness of 0.25 mm were heated as such (without being brought into contact with a fin) under the same condition as that in the above-mentioned brazing using a fluoride flux, cooled at a rate of 50° C./min or 15° C./min, and subjected to a tensile test and a corrosion test. The corrosion test was conducted as follows. Regarding the outer surface side (brazing filler metal side), the corrosion test was conducted by the 30-day CASS test. On the other hand, regarding the inner surface side (sacrificial anode material side), each material was immersed in an aqueous solution containing 100 ppm of $Cl^-$, 100 ppm of $SO_4^{2-}$, 100 ppm of $HCO_3^-$ and 10 ppm of $Cu^{2+}$ and the system was heated at 88° C. or 8 hours and allowed to stand for 16 hours while spontaneously cooling it to room temperature, and the above cycle was repeated for 3 months.

The results are summarized in Table 3. Sample Nos. 1 to 28 of the invention exhibited a good brazability, a tensile strength as high as 17 kgf/mm$^2$. Further, when the cooling rate after brazing was 50° C./min, the corrosion depths of the clad materials after brazing were not greater than 0.14 mm for the inner surface side and not greater than 0.12 mm for the outer surface side. When the cooling rate after brazing was 15° C./min, the corrosion depths of the clad materials after brazing were not greater than 0.14 mm for the inner surface side and not greater than 0.14 mm for the outer surface side. Further, the corrosion depth of the inner surface side was reduced in the order of the clad materials using the sacrificial anode materials without any one of Zn, Sn, In and Ga, the clad materials using the sacrificial anode materials with Zn, the clad materials using the sacrificial anode materials with at least one of Sn, In and Ga. In other words, although the corrosion resistance was further improved by Zn addition to the sacrificial anode materials, it is still further improved by addition of at least one of Sn, In and Ga to the sacrificial anode materials.

Comparative Sample No. 29 had a tensile strength was as low as 14 kgf/mm$^2$, since the Mg content of the sacrificial anode material was as low as 0.9%.

In comparative Sample No. 30, local melting occurred due to a high Mg content of 2.7% of the sacrificial anode material, so that the other tests were suspended.

Comparative Sample No. 31 had a tensile strength as low as 14 kgf/mm$^2$ because the Si content of the sacrificial anode material was as low as 0.03%.

In Comparative Sample No. 32, when the cooling rate after brazing was low, intergrannular corrosion occurred in its inner surface side due to a high Si content of 0.25% of the sacrificial anode material.

Comparative Sample No. 33 exhibited a large corrosion depth of 0.18 mm in its inner surface side in both cooling rates after brazing, due to a high Zn content of 3.2% of the sacrificial anode material.

Comparative Sample No. 34 had a tensile strength as low as 14 kgf/mm$^2$ because the core material had a low Mn content of 0.2%, and No. 35 provided no sound plate material because the Mn content of the core material was as high as 2.6%, so that other tests were suspended.

Comparative Sample No. 36 had a tensile strength as low as 14 kgf/mm$^2$ and a corrosion depth as large as 0.19 and 0.20 mm on the outer surface side because the Cu content of the core material was as low as 0.14%.

Comparative Sample No. 37 was subject to melting in the core material during brazing because the Cu content of the core material was too high, i.e., 1.10%, so that the other tests were suspended.

Comparative Sample No. 38 had a tensile strength as low as 15 kgf/mm$^2$ because the Si content of the core material was insufficient, i.e., 0.03%.

Comparative Sample No. 39 was subject to melting in the core material during brazing because the core material had an excessive Si content of 1.20%, so that the other tests were suspended.

Comparative Sample No. 40 had a tensile strength as low as 15 kgf/mm$^2$ because the core material was free from Mg.

Comparative Sample No. 41 was subject to brazing failure because the Mg content, 0.64%, of the core material was high.

Comparative Sample No. 42 had an low tensile strength of 12 kgf/mm$^2$ and, in both cooling rates, exhibited a large corrosion depth of 0.23 mm on the outer surface side because the core material was 3003 alloy.

Comparative Sample No. 43 had a low tensile strength of 14 kgf/mm$^2$, since the Mg content of the sacrificial anode material was as low as 0.8%.

In comparative Sample No. 44, local melting occurred in the sacrificial anode material during brazing, since the sacrificial anode material had a high Mg content of 2.0%. Therefore, the other tests were suspended.

Comparative Sample No. 45 had a tensile strength as low as 14 kgf/mm$^2$ because the Si content of the sacrificial anode material was as low as 0.03%.

In Comparative Sample No. 46, when the cooling rate after brazing was small. (i.e., 15° C./min), intergrannular corrosion occurred in the sacrificial anode material and the core material, since the sacrificial anode material had a high Si content of 0.26%.

Comparative Samples Nos. 47, 48 and 49 exhibited a large corrosion depth of 0.15 to 0.17 mm in the inner surface side because their sacrificial anode materials contained Sn, In or Ga in an excessive amount of 0.25%.

Comparative Sample No. 50 provided no sound plate material because the Mn content of the core material was as high as 2.8%, so that the other tests were suspended.

Comparative Sample No. 51 had a tensile strength as low as 14 kgf/mm$^2$ and a corrosion depth of 0.18 to 0.20 mm on the outer surface side because the Cu content of the core material was as low as 0.14%.

Comparative Sample No. 52 had a tensile strength as low as 15 kgf/mm$^2$ because the Si content of the core material was low, i.e., 0.03%.

In comparative Sample No. 53, melting occurred in the core material during brazing, since the core material had an excessive Si content of 1.20%. Therefore, the other tests were suspended.

Comparative Sample No. 54 had a low tensile strength of 12 kgf/mm$^2$ and exhibited large corrosion depths of 0.20 mm and 0.21 mm on the outer surface side because the core material was 3003.

TABLE 1

| Samples | Al | Mn | Cu | Si | Mg |
|---|---|---|---|---|---|
| Core materials of the present invention | | | | | |
| A | bal | 0.4 | 0.78 | 0.90 | 0.47 |
| A' | bal | 0.4 | 0.76 | 0.90 | 0.43 |
| B | bal | 1.0 | 0.28 | 0.58 | 0.33 |
| C | bal | 1.3 | 0.46 | 0.49 | 0.04 |
| C' | bal | 1.3 | 0.36 | 0.50 | 0.07 |
| D | bal | 1.8 | 0.60 | 0.09 | 0.15 |
| Comparative core materials | | | | | |
| E | bal | 0.2 | 0.32 | 0.22 | 0.15 |
| F | bal | 2.6 | 0.52 | 0.36 | 0.30 |
| F' | bal | 2.8 | 0.50 | 0.35 | 0.30 |
| G | bal | 1.1 | 0.14 | 0.51 | 0.24 |
| G' | bal | 1.1 | 0.14 | 0.29 | 0.18 |
| H | bal | 1.1 | 1.10 | 0.50 | 0.40 |

TABLE 1-continued

| Samples | Al | Mn | Cu | Si | Mg |
|---|---|---|---|---|---|
| I | bal | 1.1 | 0.43 | 0.03 | 0.20 |
| I' | bal | 1.1 | 0.40 | 0.03 | 0.15 |
| J | bal | 1.1 | 0.49 | 1.20 | 0.34 |
| J' | bal | 1.1 | 0.53 | 1.20 | 0.31 |
| K | bal | 1.1 | 0.33 | 0.43 | — |
| L | bal | 1.1 | 0.35 | 0.66 | 0.64 |
| M* | bal | 1.1 | 0.15 | 0.22 | — |

M* 3003 alloy

TABLE 2

| Samples | Al | Mg | Si | Zn | Sn | In | Ga |
|---|---|---|---|---|---|---|---|
| Sacrificial anode materials of the present invention | | | | | | | |
| a | bal | 1.1 | 0.19 | — | — | — | — |
| b | bal | 1.6 | 1.11 | — | — | — | — |
| c | bal | 2.3 | 0.05 | — | — | — | — |
| d | bal | 1.8 | 0.16 | 0.8 | — | — | — |
| d' | bal | 1.8 | 0.16 | 0.6 | — | — | — |
| e | bal | 1.5 | 0.08 | 2.7 | — | — | — |
| f | bal | 1.5 | 0.10 | 1.5 | — | — | — |
| g | bal | 1.2 | 0.19 | — | 0.14 | — | — |
| h | bal | 1.7 | 0.07 | — | — | 0.15 | — |
| i | bal | 2.3 | 0.10 | — | — | — | 0.16 |
| j | bal | 1.5 | 0.14 | 0.01 | 0.15 | — | — |
| k | bal | 1.5 | 0.14 | — | 0.05 | — | 0.01 |
| l | bal | 1.5 | 0.14 | — | — | 0.02 | 0.04 |
| m | bal | 1.5 | 0.14 | — | 0.02 | 0.006 | 0.02 |
| Comparative sacrificial anode materials | | | | | | | |
| n | bal | 0.9 | 0.06 | — | — | — | — |
| o | bal | 2.7 | 0.10 | 1.0 | — | — | — |
| p | bal | 1.5 | 0.03 | — | — | — | — |
| q | bal | 1.5 | 0.25 | 0.6 | — | — | — |
| r | bal | 1.5 | 0.14 | 3.2 | — | — | — |
| s | bal | 0.8 | 0.14 | — | 0.04 | — | — |
| t | bal | 2.8 | 0.14 | — | — | 0.02 | — |
| u | bal | 1.5 | 0.03 | — | — | — | 0.02 |
| v | bal | 1.5 | 0.26 | — | — | 0.01 | — |
| w | bal | 1.5 | 0.15 | — | 0.25 | — | — |
| x | bal | 1.5 | 0.15 | — | — | 0.25 | — |
| y | bal | 1.5 | 0.15 | — | — | — | 0.25 |

TABLE 3

| | Combination | | | | Tensile strength after brazing (kgf/mm²) | Maximum corrosion depth (mm) | | | |
|---|---|---|---|---|---|---|---|---|---|
| | | | | | | Cooling rate after brazing (50° C./min) | | Cooling rate after brazing (15° C./min) | |
| No. | Core material | Sacrificial anode material | Brazing filler metal | Brazability | | Inner surface side | Outer surface side | Inner surface side | Outer surface side |
| 1 | A | a | 4045 | ○ | 17 | 0.14 | 0.11 | 0.14 | 0.12 |
| 2 | A | b | 4045 | ○ | 17 | 0.13 | 0.12 | 0.14 | 0.12 |
| 3 | A | c | 4045 | ○ | 17 | 0.12 | 0.12 | 0.13 | 0.13 |
| 4 | C | a | 4045 | ○ | 17 | 0.13 | 0.11 | 0.14 | 0.11 |
| 5 | C | b | 4045 | ○ | 18 | 0.13 | 0.11 | 0.13 | 0.12 |
| 6 | C | c | 4045 | ○ | 17 | 0.12 | 0.11 | 0.13 | 0.11 |
| 7 | D | a | 4045 | ○ | 17 | 0.13 | 0.12 | 0.13 | 0.12 |
| 8 | D | b | 4045 | ○ | 17 | 0.14 | 0.11 | 0.14 | 0.12 |
| 9 | D | c | 4045 | ○ | 18 | 0.13 | 0.12 | 0.12 | 0.11 |
| 10 | B | d | 4045 | ○ | 17 | 0.11 | 0.12 | 0.11 | 0.12 |
| 11 | B | e | 4045 | ○ | 17 | 0.12 | 0.12 | 0.11 | 0.11 |
| 12 | B | f | 4045 | ○ | 17 | 0.10 | 0.11 | 0.11 | 0.11 |
| 13 | B | d | 4045 | ○ | 18 | 0.09 | 0.12 | 0.10 | 0.12 |
| 14 | B | e | 4045 | ○ | 17 | 0.10 | 0.11 | 0.10 | 0.11 |
| 15 | B | f | 4045 | ○ | 17 | 0.08 | 0.11 | 0.09 | 0.11 |
| 16 | B | d | 4045 | ○ | 17 | 0.09 | 0.12 | 0.10 | 0.11 |
| 17 | B | e | 4045 | ○ | 18 | 0.10 | 0.11 | 0.10 | 0.11 |
| 18 | B | f | 4045 | ○ | 17 | 0.10 | 0.11 | 0.09 | 0.11 |
| 19 | A' | g | 4343 | ○ | 18 | 0.05 | 0.10 | 0.06 | 0.12 |
| 20 | A' | h | 4343 | ○ | 18 | 0.05 | 0.12 | 0.05 | 0.13 |
| 21 | A' | i | 4343 | ○ | 19 | 0.05 | 0.11 | 0.06 | 0.12 |
| 22 | C' | g | 4343 | ○ | 17 | 0.05 | 0.12 | 0.06 | 0.13 |
| 23 | C' | h | 4343 | ○ | 18 | 0.06 | 0.11 | 0.06 | 0.12 |
| 24 | C' | i | 4343 | ○ | 18 | 0.06 | 0.11 | 0.07 | 0.13 |
| 25 | C' | j | 4343 | ○ | 17 | 0.05 | 0.11 | 0.05 | 0.13 |
| 26 | C' | k | 4343 | ○ | 17 | 0.06 | 0.12 | 0.07 | 0.14 |
| 27 | C' | l | 4343 | ○ | 17 | 0.05 | 0.11 | 0.06 | 0.12 |
| 28 | C' | m | 4343 | ○ | 17 | 0.05 | 0.11 | 0.06 | 0.13 |
| 29 | C | n* | 4343 | ○ | 14 | 0.14 | 0.11 | 0.14 | 0.12 |
| 30 | C | o* | 4045 | x (local melting) | — | — | — | — | — |
| 31 | C | p* | 4045 | ○ | 14 | 0.14 | 0.12 | 0.14 | 0.12 |
| 32 | C | q* | 4045 | ○ | 17 | 0.12 | 0.11 | 0.23** | 0.13 |
| 33 | C | r* | 4045 | ○ | 17 | 0.18 | 0.12 | 0.18 | 0.12 |
| 34 | E* | l | 4045 | ○ | 14 | 0.12 | 0.11 | 0.13 | 0.12 |
| 35 | F* | l | 4045 | — | — | — | — | — | — |
| 36 | G* | l | 4045 | ○ | 14 | 0.11 | 0.19 | 0.14 | 0.20 |
| 37 | H* | l | 4045 | x (melting) | — | — | — | — | — |
| 38 | I* | l | 4045 | ○ | 15 | 0.12 | 0.12 | 0.13 | 0.12 |
| 39 | J* | l | 4045 | x (melting) | — | — | — | — | — |
| 40 | K* | l | 4045 | ○ | 15 | 0.11 | 0.12 | 0.11 | 0.12 |
| 41 | L* | l | 4045 | x (joining failure) | 18 | 0.12 | 0.11 | 0.12 | 0.13 |
| 42 | M* | l | 4045 | ○ | 12 | 0.13 | 0.23 | 0.13 | 0.23 |
| 43 | C | s* | 4045 | ○ | 14 | 0.13 | 0.11 | 0.06 | 0.13 |
| 44 | C | t* | 4343 | x (local melting) | — | — | — | — | — |
| 45 | C | u* | 4343 | ○ | 14 | 0.05 | 0.12 | 0.06 | 0.13 |
| 46 | C | v* | 4343 | ○ | 18 | 0.06 | 0.11 | 0.20** | 0.12 |

TABLE 3-continued

| No. | Combination | | | Brazability | Tensile strength after brazing (kgf/mm²) | Maximum corrosion depth (mm) | | | |
| | Core material | Sacrificial anode material | Brazing filler metal | | | Cooling rate after brazing (50° C./min) | | Cooling rate after brazing (15° C./min) | |
| | | | | | | Inner surface side | Outer surface side | Inner surface side | Outer surface side |
| --- | --- | --- | --- | --- | --- | --- | --- | --- | --- |
| 47 | C | w* | 4343 | o | 17 | 0.16 | 0.12 | 0.17 | 0.13 |
| 48 | C | x* | 4343 | o | 17 | 0.16 | 0.12 | 0.16 | 0.12 |
| 49 | C | y* | 4343 | o | 17 | 0.15 | 0.11 | 0.16 | 0.12 |
| 50 | F'* | j | 4343 | o | — | — | — | — | — |
| 51 | G'* | j | 4343 | o | 14 | 0.06 | 0.18 | 0.07 | 0.20 |
| 52 | I'* | j | 4343 | o | 15 | 0.06 | 0.12 | 0.06 | 0.13 |
| 53 | J'* | j | 4343 | x (melting) | — | — | — | — | — |
| 54 | M* | j | 4343 | o | 12 | 0.06 | 0.20 | 0.08 | 0.21 |

Nos. 1-28: Samples of the Present Invention
Nos. 29-54: Comparative Samples
M*: 3003 alloy
**Intergranular Corrosion

EXAMPLE 2

Ingots of the Ti-containing aluminum alloys for core materials specified in Table 4, the aluminum alloys for the sacrificial anode materials specified in Table 2 and 4045 alloy (Al-10.2% Si) and 4343 alloy (Al-7.5% Si) for the brazing filler metals were prepared. Test samples were prepared from the thus obtained materials in the same way as described in Example 1.

The compositions of alloys for the respective materials and combinations of the materials are as listed in Table 5.

The test samples were subjected to the same tensile test and corrosion test as set forth in Example 1.

The results are summarized in Table 5. Sample Nos. 55 to 79 of the invention exhibited a good brazability, a tensile strength as high as 17 kgf/mm². Further, when the cooling rate after brazing was 50° C./min, the corrosion depths of the clad materials after brazing were not greater than 0.13 mm for the inner surface side and not greater than 0.10 mm for the outer surface side. When the cooling rate after brazing was 15° C./min, the corrosion depths of the clad materials after brazing were not greater than 0.14 mm for the inner surface side and not greater than 0.11 mm for the outer surface side.

Further, with respect to the corrosion depth in the inner surface sides of the clad materials, the clad materials prepared in Example 2, in which the Ti-containing core materials were used, were compared with the clad materials in Example 1 in which the Ti-free clad materials were used. This comparison showed that the Ti-containing core materials resulted in a further reduced corrosion depth. Therefore, it can be seen that the clad materials using the Ti-containing core material has a much higher corrosion resistance as compared with the clad material using the Ti-free clad materials. Further, it can be seen from the results in Table 5 that the corrosion depth of the inner surface side is reduced in the order of the clad materials using the sacrificial anode materials without any one of Zn, Sn, In and Ga, the clad materials using the sacrificial anode materials with Zn, the clad materials using the sacrificial anode materials with at least one selected among from Sn, In and Ga. In other words, although the corrosion resistance is further improved by Zn addition to the sacrificial anode materials, it is still further improved by addition of at least one of Sn, In and Ga to the sacrificial anode materials.

Comparative Sample No. 80 had a low tensile strength of 14 kgf/mm², since the Mg content of the sacrificial anode material was as low as 0.9%.

In comparative Sample No. 81, local melting occurred in the sacrificial anode material during brazing due to a high Mg content of 2.7% of the sacrificial anode material, so that the other tests were suspended.

Comparative Sample No. 82 had a tensile strength as low as 15 kgf/mm² because the sacrificial anode material had a low Si content of 0.03%.

In Comparative Sample No. 83, when the lower cooling rate (15° C./min) was used after brazing, intergranular corrosion occurred in its inner surface side due to a high Si content of 0.25% of the sacrificial anode material.

Comparative Sample No. 84 exhibited large corrosion depths of 0.17 mm and 0.18 mm in the inner surface side due to a high Zn content of 3.2% of the sacrificial anode material.

Comparative Sample No. 85 had a tensile strength as low as 14 kgf/mm² because the core material had a low Mn content of 0.2%, and No. 86 provided no sound plate material because the Mn content of the core material was as high as 2.6%, so that the other tests were suspended.

Comparative Sample No. 87 had a tensile strength as low as 15 kgf/mm² and large corrosion depths of 0.19 mm and 0.20 mm on the outer surface side because the Cu content of the core material was as low as 0.15%.

In Comparative Sample No. 88, melting occurred in the core material during brazing because the Si content of the core material was as high as 1.10%, so that the other tests were suspended.

Comparative Sample No. 89 had a tensile strength as low as 15 kgf/mm² because the Si content of the core material was low, i.e., 0.03%.

Comparative Sample No. 90 was subject to melting in the core material during brazing because the core material had a high Si content of 1.20%, so that the other tests were suspended.

Comparative Sample No. 91 had a tensile strength as low as 14 kgf/mm² because the core material was free from Mg.

Comparative Sample No. 92 was subject to brazing failure because the Mg content, 0.61%, of the core material was too high.

Comparative Sample No. 93 provided no sound plate material due to a high Ti content of 0.43% and no test was conducted.

Comparative Sample No. 94 had a low tensile strength of 12 kgf/mm² and exhibited large corrosion depths of 0.22 mm and 0.23 mm on the outer surface side because the core material was 3003 alloy.

Comparative Sample No. 95 had a low tensile strength of 14 kgf/mm², since the sacrificial anode material had an insufficient Mn content of 0.2%.

Comparative Sample No. 96 was subject to melting in the core material during brazing, since the sacrificial anode material had a high Cu content of 1.10%. Therefore, the other tests were suspended.

Comparative Sample No. 97 had a low tensile strength of 15 kgf/mm² because the core material contained no Mg.

Comparative Sample No. 98 was subject to brazing failure because the Mg content, 0.61%, of the core material was too high.

Comparative Sample No. 99 provided no sound plate material because the core material had a high Ti content of 0.43%.

TABLE 4

| Samples | Al | Mn | Cu | Si | Mg | Ti |
|---|---|---|---|---|---|---|
| Core materials of the present invention | | | | | | |
| A | bal | 0.4 | 0.80 | 0.90 | 0.48 | 0.20 |
| B | bal | 1.0 | 0.28 | 0.61 | 0.30 | 0.31 |
| B' | bal | 1.1 | 0.29 | 0.63 | 0.30 | 0.29 |
| C | bal | 1.2 | 0.51 | 0.49 | 0.04 | 0.15 |
| D | bal | 1.8 | 0.60 | 0.09 | 0.25 | 0.07 |
| D' | bal | 1.8 | 0.59 | 0.08 | 0.12 | 0.09 |
| Comparative core materials | | | | | | |
| E | bal | 0.2 | 0.35 | 0.32 | 0.15 | 0.23 |
| E' | bal | 0.2 | 0.37 | 0.32 | 0.20 | 0.19 |
| F | bal | 2.6 | 0.50 | 0.38 | 0.30 | 0.10 |
| G | bal | 1.1 | 0.15 | 0.55 | 0.21 | 0.17 |
| H | bal | 1.1 | 1.10 | 0.50 | 0.40 | 0.15 |
| H' | bal | 1.1 | 1.10 | 0.55 | 0.45 | 0.20 |
| I | bal | 1.1 | 0.45 | 0.03 | 0.20 | 0.22 |
| J | bal | 1.1 | 0.49 | 1.20 | 0.31 | 0.20 |
| K | bal | 1.1 | 0.35 | 0.43 | — | 0.13 |
| K' | bal | 1.1 | 0.35 | 0.41 | — | 0.16 |
| L | bal | 1.1 | 0.35 | 0.66 | 0.61 | 0.15 |
| L' | bal | 1.1 | 0.35 | 0.16 | 0.61 | 0.15 |
| N | bal | 1.1 | 0.50 | 0.71 | 0.10 | 0.43 |
| N' | bal | 1.1 | 0.49 | 0.66 | 0.25 | 0.43 |
| O* | bal | 1.1 | 0.15 | 0.20 | — | — |
| O'* | bal | 1.1 | 0.15 | 0.21 | — | — |

O, O'*: 3003 alloy

TABLE 5

| No. | Combination Core material | Combination Sacrificial anode material | Combination Brazing filler metal | Brazability | Tensile strength after brazing (kgf/mm²) | Maximum corrosion depth (mm) Cooling rate after brazing (50° C./min) Inner surface side | Maximum corrosion depth (mm) Cooling rate after brazing (50° C./min) Outer surface side | Maximum corrosion depth (mm) Cooling rate after brazing (15° C./min) Inner surface side | Maximum corrosion depth (mm) Cooling rate after brazing (15° C./min) Outer surface side |
|---|---|---|---|---|---|---|---|---|---|
| 55 | A | a | 4045 | o | 17 | 0.12 | 0.09 | 0.13 | 0.10 |
| 56 | A | b | 4045 | o | 17 | 0.12 | 0.09 | 0.14 | 0.10 |
| 57 | A | c | 4045 | o | 17 | 0.11 | 0.08 | 0.13 | 0.09 |
| 58 | C | a | 4045 | o | 17 | 0.13 | 0.09 | 0.13 | 0.09 |
| 59 | C | b | 4045 | o | 18 | 0.12 | 0.09 | 0.13 | 0.10 |
| 60 | C | c | 4045 | o | 18 | 0.12 | 0.10 | 0.13 | 0.10 |
| 61 | D | a | 4045 | o | 18 | 0.12 | 0.09 | 0.13 | 0.10 |
| 62 | D | b | 4045 | o | 18 | 0.13 | 0.08 | 0.13 | 0.09 |
| 63 | D | c | 4045 | o | 18 | 0.12 | 0.08 | 0.14 | 0.10 |
| 64 | B | d' | 4045 | o | 17 | 0.09 | 0.10 | 0.11 | 0.10 |
| 65 | B | e | 4045 | o | 17 | 0.09 | 0.10 | 0.10 | 0.11 |
| 66 | B | f | 4045 | o | 17 | 0.09 | 0.10 | 0.09 | 0.11 |
| 67 | B | d' | 4045 | o | 18 | 0.06 | 0.08 | 0.08 | 0.09 |
| 68 | B | e | 4045 | o | 17 | 0.05 | 0.10 | 0.08 | 0.11 |
| 69 | B | f | 4045 | o | 17 | 0.05 | 0.09 | 0.07 | 0.11 |
| 70 | B | d' | 4045 | o | 18 | 0.05 | 0.09 | 0.07 | 0.09 |
| 71 | B | e | 4045 | o | 18 | 0.06 | 0.09 | 0.09 | 0.10 |
| 72 | B | f | 4045 | o | 17 | 0.06 | 0.08 | 0.08 | 0.09 |
| 73 | B' | j | 4343 | o | 17 | 0.04 | 0.09 | 0.05 | 0.10 |
| 74 | B' | k | 4343 | o | 18 | 0.04 | 0.10 | 0.04 | 0.10 |
| 75 | B' | l | 4343 | o | 17 | 0.04 | 0.09 | 0.04 | 0.10 |
| 76 | D' | j | 4343 | o | 18 | 0.03 | 0.09 | 0.05 | 0.10 |
| 77 | D' | k | 4343 | o | 18 | 0.04 | 0.10 | 0.04 | 0.11 |
| 78 | D' | l | 4343 | o | 18 | 0.05 | 0.09 | 0.06 | 0.10 |
| 79 | D' | m | 4343 | o | 18 | 0.05 | 0.09 | 0.05 | 0.10 |
| 80 | C | n* | 4343 | o | 14 | 0.12 | 0.08 | 0.14 | 0.10 |
| 81 | C | o* | 4045 | x (local melting) | — | — | — | — | — |
| 82 | C | p* | 4045 | o | 15 | 0.12 | 0.10 | 0.13 | 0.12 |
| 83 | C | q* | 4045 | o | 17 | 0.10 | 0.10 | 0.23** | 0.12 |
| 84 | C | r* | 4045 | o | 17 | 0.17 | 0.09 | 0.18 | 0.11 |
| 85 | E* | f | 4045 | o | 14 | 0.10 | 0.10 | 0.11 | 0.11 |
| 86 | F* | f | 4045 | — | — | — | — | — | — |
| 87 | G* | f | 4045 | o | 15 | 0.10 | 0.19 | 0.12 | 0.20 |
| 88 | H* | f | 4045 | x (melting) | — | — | — | — | — |
| 89 | I* | f | 4045 | o | 15 | 0.09 | 0.09 | 0.10 | 0.11 |
| 90 | J* | f | 4045 | x (melting) | — | — | — | — | — |
| 91 | K* | f | 4045 | o | 14 | 0.09 | 0.11 | 0.11 | 0.10 |
| 92 | L* | f | 4045 | x (joining failure) | 19 | 0.09 | 0.10 | 0.12 | 0.12 |
| 93 | N* | f | 4045 | — | — | — | — | — | — |
| 94 | O* | f | 4045 | o | 12 | 0.13 | 0.22 | 0.13 | 0.23 |
| 95 | E'* | j | 4343 | o | 14 | 0.05 | 0.10 | 0.06 | 0.11 |

TABLE 5-continued

| | Combination | | | | Tensile strength after brazing (kgf/mm²) | Maximum corrosion depth (mm) | | | |
|---|---|---|---|---|---|---|---|---|---|
| | | | | | | Cooling rate after brazing (50° C./min) | | Cooling rate after brazing (15° C./min) | |
| No. | Core material | Sacrificial anode material | Brazing filler metal | Brazability | | Inner surface side | Outer surface side | Inner surface side | Outer surface side |
| 96 | H'* | j | 4343 | x (melting) | — | — | — | — | — |
| 97 | K'* | j | 4343 | o | 15 | 0.05 | 0.10 | 0.06 | 0.10 |
| 98 | L'* | j | 4343 | x (joining failure) | 18 | 0.05 | 0.10 | 0.07 | 0.11 |
| 99 | N'* | j | 4343 | — | — | — | — | — | — |

Nos. 55-79: Samples of the Present Invention
Nos. 80-99: Comparative Samples
O*: 3003 alloy
**Intergranular Corrosion As described above, the clad material of the present invention is one to be used for an Al heat exchanger which has a high strength, a high corrosion resistance and an excellent brazability and can be brazed by flux brazing with a fluorite flux, or by vacuum brazing. This enables the wall thickness of tube materials and header materials to be reduced, so that it becomes possible to reduce the weight of a radiator or heater.

What is claimed is:

1. A clad aluminum alloy having high strength and high corrosion resistance for a heat exchanger, which is composed of:
   a core material made of an aluminum alloy consisting of 0.3 to 2.0% of Mn, 0.25 to 0.8% of Cu, 0.05 to 1.0% of Si and 0.5% or less of Mg with the balance consisting of Al and unavoidable impurities;
   a sacrificial anode material bonded to one surface of said core material, said sacrificial anode material being made of an aluminum alloy consisting essentially of 1.0 to 2.5% of Mg and 0.05 to less than 0.20% of Si with the balance being Al and unavoidable impurities; and
   a cladding bonded to the other surface of said core material, said cladding being made of a brazing filler metal consisting of an Al-Si-base aluminum alloy.

2. A clad aluminum alloy material as claimed in claim 1, wherein said sacrificial anode material is made of an aluminum alloy consisting of 1.0 to 2.5% of Mg, 0.05 to less than 0.20% of Si and 3.0% or less of Zn with the balance consisting of Al and unavoidable impurities.

3. A clad aluminum alloy material as claimed in claim 1, wherein said sacrificial anode material is made of an aluminum alloy consisting of 1.0 to 2.5% of Mg, 0.05 to less than 0.20% of Si and at least one member selected from the group consisting of 0.2% or less of In, 0.2% or less of Sn and 0.2% or less of Ga with the balance consisting of Al and unavoidable impurities.

4. A clad aluminum alloy having high strength and high corrosion resistance for a heat exchanger, which is composed of:
   a core material made of an aluminum alloy consisting of 0.3 to 2.0% of Mn, 0.25 to 0.8% of Cu, 0.05 to 1.0% of Si, 0.5% or less of Mg and 0.35% or less of Ti with the balance consisting of Al and unavoidable impurities;
   a sacrificial anode material bonded to one surface of said core material, said sacrificial anode material being made of an aluminum alloy consisting essentially of 1.0 to 2.5% of Mg and 0.05 to less than 0.20% of Si with the balance being Al and unavoidable impurities; and
   a cladding bonded to the other surface of said core material, said cladding being made of a brazing filler metal consisting of an Al-Si-base aluminum alloy.

5. A clad aluminum alloy material as claimed in claim 4, wherein said sacrificial anode material is made of an aluminum alloy consisting of 1.0 to 2.5% of Mg, 0.05 to less than 0.20% of Si and 3.0% or less of Zn with the balance consisting of Al and unavoidable impurities.

6. A clad aluminum alloy material as claimed in claim 4, wherein said sacrificial anode material is made of an aluminum alloy consisting of 1.0 to 2.5% of Mg, 0.05 to less than 0.20% of Si and at least one member selected from the group consisting of 0.2% or less of In, 0.2% or less of Sn and 0.2% or less of Ga with the balance consisting of Al and unavoidable impurities.

* * * * *